No. 835,969. PATENTED NOV. 13, 1906.
F. MERTINZ.
DIE FOR CUTTING AND PUNCHING LEATHER, &c.
APPLICATION FILED JULY 7, 1906.
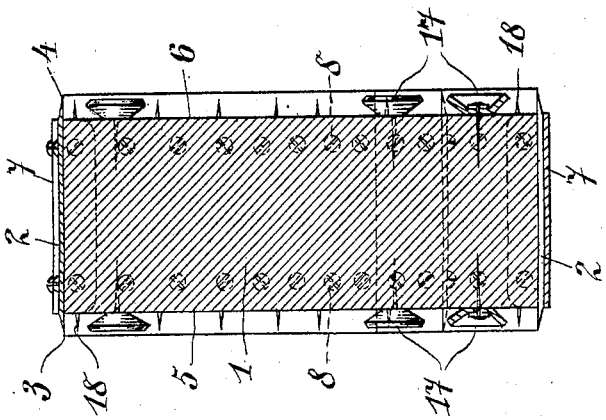
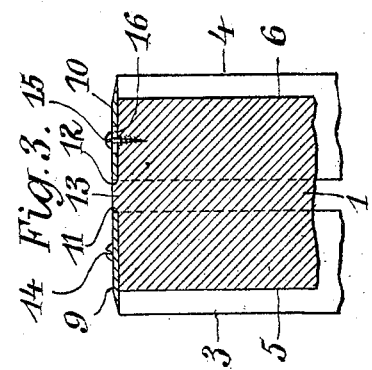
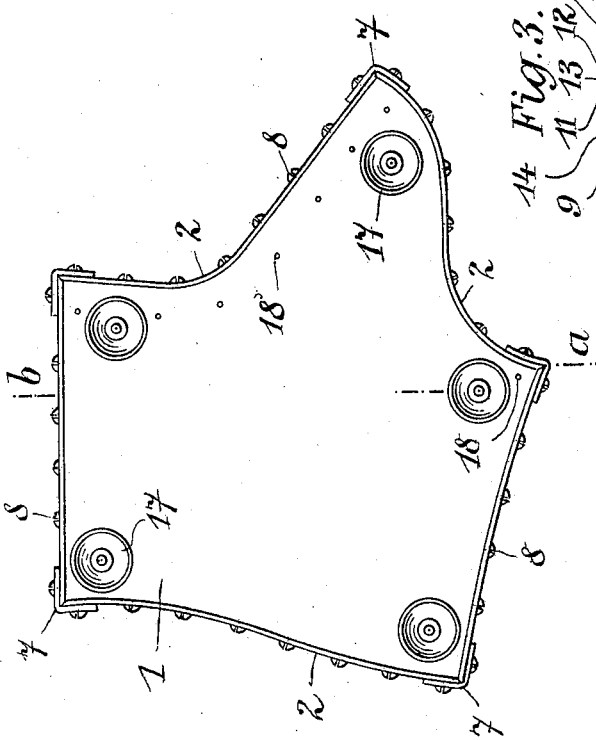
WITNESSES:
W. M. Avery
J. P. Davis
INVENTOR
Franz Mertinz
BY Munn & Co
ATTORNEYS

UNITED STATES PATENT OFFICE.

FRANZ MERTINZ, OF VIENNA, AUSTRIA-HUNGARY.

DIE FOR CUTTING AND PUNCHING LEATHER, &c.

No. 835,969.   Specification of Letters Patent.   Patented Nov. 13, 1906.

Application filed July 7, 1906. Serial No. 325,127.

*To all whom it may concern:*

Be it known that I, FRANZ MERTINZ, manufacturer, a subject of the Emperor of Austria-Hungary, residing at Vienna, in the Empire of Austria-Hungary, VII., Schottenfeldgasse 63, have invented new and useful Improvements in Dies for Cutting and Punching Leather, &c.; and I do hereby declare the following to be a full, clear, and exact description of the invention, such as will enable others skilled in the art to which it appertains to make and use the same.

My invention relates to dies, and especially such dies as may be used to cut out right and left hand work-pieces for leather goods.

I am well aware that punching-machines or cutting-presses are used for cutting or punching out leather goods which are more or less complicated and, further, that there are devices known which carry a one-edged blade only.

The object of my invention is a punching device for right and left hand goods consisting of two-edged blades secured to the circumference of a suitable core in such a manner that the cutting edges protrude over the faces of the core. By exerting a pressure or a blow upon any point of the core an equal action is borne upon the whole length of the cutting edges, and by merely turning the die right and left hand work-pieces may be cut out in immediate succession.

In the drawings a die shaped to be used for cutting out the upper-leather of shoes is represented in Figure 1 in a plan view, and in Fig. 2 in a vertical section along the line *a b* of Fig. 1. Fig. 3 shows a partially-broken-away section of another arrangement of the cutting-blades.

The die consists of a solid core 1, shaped exactly according to the pattern required and preferably made of wood. To the circumference of the core cutting-blades 2, of thin steel, are secured in such a way that the cutting edges 3 4 protrude over each of the two opposite faces 5 6 of the core. It is advisable to employ watch-spring steel for the manufacture of the cutting-blades, because this steel will adhere closely to the circumference of the core. If the core has abrupt edges, I prefer to make the cutting-blade of several pieces, which may be joined together on the edges by suitable angles 7. The division of the cutting-blade into several parts has the further advantage that any part becoming dull or otherwise injured can be removed separately.

The cutting edges 3 4 for both faces may be both arranged upon one blade, as shown in Fig. 2. In this case both rows of the fastening-bolts 8 take up the pressure exerted upon the cutting edge 3 or 4, whereby the blades are kept secure upon the core; but a separate knife 9 10 may be just as well arranged for the cutting edge of each face, as shown in Fig. 3. In the latter case I prefer to place the knife-backs 11 12 upon a protruding strip or a cleat 13 of the core 1, whereby the fastening-bolts 14 15 of each blade are released. These knives may also be adjustably arranged upon the core—for instance, as shown at the right-hand half of Fig. 3. They only need be slotted, the slots 16 running in the direction of the height of the core, or several rows of holes may be arranged in the blade, the latter one being secured by nuts upon immovable screw-bolts.

In order to prevent the cutting edges to be driven too deep into the working-table or punching-board and to facilitate the removal of the cut-out piece from the device or to remove it automatically, concavo-convex rubber disks 17 are secured to both faces 5 6 of the core in such a manner that the disk-rim stands off the face, while the disk center is nailed to the face of the core. During the cutting operation the disks of the downwardly-turned face are compressed and their rims pressed upon the face of the core; but as soon as the punching device is lifted they return into their normal position and press the cut-out pattern off the core, so that the work-piece may be easily removed or falls off by itself. The concavo-convex disks are important and useful in that they secure an ejecting effect, not only because of their compressibility, but also because of their resilience, resulting from their special form. In operation it will be understood that when the disks are pressed back and then released their tendency is to return by their resilience, apart from their compressibility, to normal position, and in so returning they exercise an ejecting effect upon the cut material throughout their circumference, the effect being distinctly different from and superior to the ejection resulting from the return of rubber after being simply compressed. By means of these disks the device is also cheapened, not only as to the disks, which are cheaper than solid-rubber blocks, but also as to the cutting-blades, for with such disks the blades do not have to project as far from the core as they would if rubber blocks were employed, and consequently can be made of much lighter material.

The faces 5 6 of the core may also be provided with pins 18 or pointed studs, which serve for making working-marks into the leather during the stamping operation. Such marks are needed to locate, for instance, buttonholes, holes for ears, hooks, or other fastening means, as well as to indicate the connecting-points for different parts which have to be put together.

In using the die it is put upon the material which has to be cut or punched and a pressure or a blow with a hammer or stamper is exerted upon a part of the upper face of the core. In consequence thereof the cutting edges penetrate equally and simultaneously into the material, cutting out a part corresponding to the shape of the device. By merely turning the die upon its other face right and left hand cut-outs are obtained in succession, and an equal number of right and left hand pieces—as are, for instance, required for shoes—is insured without any further control.

My invention may not only be applied to the manufacture of shoes or other leather goods, but paper, pasteboard, and similar material may just as well be cut or punched with my device, the shape of which may be varied according to the pattern desired.

What I claim as my invention, and desire to secure by Letters Patent, is—

1. In a die of the character described, a core, a cutting-knife secured to the circumference of the core and having its cutting edge projecting beyond the face of the core, and concavo-convex rubber disks secured to the face of the said core.

2. A die for cutting out right and left hand patterns especially for leather goods, consisting of a solid core provided with two-edged blades upon its circumference, each cutting edge protruding over one face of the core and concavo-convex rubber disks arranged upon both faces of the core, to facilitate the removal of the cut-out piece from the device, as set forth.

3. A die for the purpose described, consisting of a solid core, carrying one-edged knives adjustably secured upon its circumference in the direction of the height of the core, the cutting edges of said knives reaching over the faces of the core, as set forth.

4. A die for the purpose described, consisting of a solid core carrying one-edged knives adjustably secured upon its circumference in the direction of the height of the core, the cutting edges of said knives reaching over the faces of the core, and rubber disks arranged upon both faces of the core, as set forth.

5. A die for the purpose described, consisting of a solid core carrying one-edged knives adjustably secured upon its circumference in the direction of the height of the core the cutting edges of said knives reaching over the faces of the core, and marking-pins upon both faces of the core, as set forth.

6. A die for the purpose described, consisting of a solid core carrying one-edged knives adjustably secured upon its circumference in the direction of the height of the core the cutting edges of said knives reaching over the faces of the core, elastic rubber disks and marking-pins arranged upon both faces of the core, as set forth.

In testimony whereof I have signed my name to this specification in the presence of two subscribing witnesses.

FRANZ MERTINZ.

Witnesses:
　WENZEL RUDOLF SINKE,
　ALVESTO S. HOGUE.